(12) United States Patent
Hellsten

(10) Patent No.: US 9,071,337 B2
(45) Date of Patent: Jun. 30, 2015

(54) WIDEBAND TRANSMITTER/RECEIVER ARRANGEMENT FOR MULTIFUNCTIONAL RADAR AND COMMUNICATION

(75) Inventor: Hans Hellsten, Linkoping (SE)

(73) Assignee: SAAB AB, Linkoping (SE)

( * ) Notice: Subject to any disclaimer, the term of this patent is extended or adjusted under 35 U.S.C. 154(b) by 222 days.

(21) Appl. No.: 13/578,804

(22) PCT Filed: Feb. 17, 2010

(86) PCT No.: PCT/SE2010/050183
§ 371 (c)(1),
(2), (4) Date: Oct. 2, 2012

(87) PCT Pub. No.: WO2011/102762
PCT Pub. Date: Aug. 25, 2011

(65) Prior Publication Data
US 2013/0201050 A1    Aug. 8, 2013

(51) Int. Cl.
*G01S 7/03* (2006.01)
*G01S 7/40* (2006.01)
(Continued)

(52) U.S. Cl.
CPC . *H04B 1/44* (2013.01); *G01S 7/006* (2013.01); *G01S 7/038* (2013.01); *G01S 7/4021* (2013.01); *G01S 13/32* (2013.01); *G01S 13/90* (2013.01); *G01S 7/03* (2013.01)

(58) Field of Classification Search
CPC ........... G01S 7/003; G01S 7/006; G01S 7/02; G01S 7/03; G01S 7/038; G01S 7/40; G01S 7/4004; G01S 7/4021; G01S 13/02; G01S 13/06; G01S 13/08; G01S 13/32; G01S 13/88; G01S 13/89; G01S 13/90; H04B 1/38; H04B 1/40; H04B 1/44
USPC ........... 342/21, 27, 28, 29–40, 61–65, 73, 74, 342/118, 128–133, 175, 192–204, 89, 342/104–109, 120, 159, 165, 173, 174, 350, 342/352, 357.2, 357.39, 357.51, 357.59, 342/25 R–25 F, 60, 52; 331/45, 78; 327/100, 327/105–107, 164; 341/126, 144–154; 702/1, 57, 66, 108, 117, 118, 127, 702/189–191; 455/73, 84, 86, 87, 130, 296, 455/303–307; 375/130, 140, 147, 148, 229, 375/230, 232, 259, 260, 267, 316, 346, 349, 375/350
See application file for complete search history.

(56) References Cited

U.S. PATENT DOCUMENTS 3,703,004 A *  11/1972  Slater ............................ 342/194
3,789,398 A     1/1974   Erst
(Continued)

FOREIGN PATENT DOCUMENTS

| CN | 100386967 C | 5/2008 |
|----|----|----|
| WO | WO-2004/097451 A1 | 11/2004 |
| WO | WO-2009/156510 A2 | 12/2009 |

OTHER PUBLICATIONS

International Search Report/ Written Opinion for PCT/SE2010/050183; Oct. 28, 2010; 16 pages.
(Continued)

*Primary Examiner* — Bernarr Gregory
(74) *Attorney, Agent, or Firm* — Alston & Bird LLP

(57) ABSTRACT

A transmitter/receiver arrangement comprises a digital arbitrary waveform generator AWG connected to a transmitter. Said waveform generator is configured to generate an arbitrary waveform within a given bandwidth. Said transmitter/receiver arrangement further comprises an antenna arrangement configured to emit a transmitter signal, and to receive an incident signal, a receiver configured to receive a receiver signal, and an analog isolator connected to said antenna arrangement, said transmitter, and said receiver. Said analog isolator is adapted to route said transmitter signal from said transmitter to said antenna arrangement, and said incident signal from said antenna arrangement to said receiver, and to isolate said transmitter signal from said receiver signal. Said receiver is adapted to cancel any residual transmitter signal in said receiver signal by means of at least one digital model of at least said isolator, said antenna arrangement, and said transmitter.

18 Claims, 8 Drawing Sheets

(51) Int. Cl.
*G01S 7/491* (2006.01)
*G01S 13/32* (2006.01)
*G01S 13/90* (2006.01)
*H04B 1/44* (2006.01)
*G01S 7/00* (2006.01)
*G01S 13/00* (2006.01)

(56) References Cited

U.S. PATENT DOCUMENTS

| | | | | |
|---|---|---|---|---|
| 4,044,357 | A * | 8/1977 | Goldie | 342/200 |
| 4,325,138 | A * | 4/1982 | Zscheile, Jr. | 375/130 |
| 4,349,916 | A * | 9/1982 | Roeder | 375/349 |
| 4,682,175 | A * | 7/1987 | Lazarus | 342/165 |
| 4,725,842 | A * | 2/1988 | Mayberry | 342/198 |
| 4,825,214 | A * | 4/1989 | Dejaegher | 342/165 |
| 4,837,579 | A * | 6/1989 | Pease et al. | 342/197 |
| 4,968,967 | A * | 11/1990 | Stove | 342/165 |
| 4,970,519 | A * | 11/1990 | Minnis et al. | 342/165 |
| 5,768,131 | A * | 6/1998 | Lissel et al. | 342/109 |
| 5,796,779 | A * | 8/1998 | Nussbaum et al. | 375/267 |
| 5,861,837 | A * | 1/1999 | Richardson et al. | 342/198 |
| 5,969,667 | A | 10/1999 | Farmer et al. | |
| 6,038,526 | A * | 3/2000 | Stein | 702/191 |
| 6,043,770 | A * | 3/2000 | Garcia et al. | 342/159 |
| 6,278,961 | B1 * | 8/2001 | Kadtke et al. | 702/189 |
| 6,441,792 | B1 | 8/2002 | Sievenpiper et al. | |
| 6,470,047 | B1 * | 10/2002 | Kleinerman et al. | 375/232 |
| 6,559,791 | B1 * | 5/2003 | Davidson | 342/195 |
| 6,564,176 | B2 * | 5/2003 | Kadtke et al. | 702/189 |
| 6,771,723 | B1 * | 8/2004 | Davis et al. | 375/350 |
| 6,822,487 | B2 * | 11/2004 | Tejima et al. | 327/105 |
| 6,833,808 | B2 * | 12/2004 | Rees et al. | 342/159 |
| 7,202,812 | B2 * | 4/2007 | Krikorian et al. | 342/159 |
| 7,406,140 | B2 * | 7/2008 | Kunieda et al. | 375/346 |
| 7,443,337 | B2 * | 10/2008 | Jaklitsch | 342/195 |
| 7,551,118 | B2 * | 6/2009 | Hellsten | 342/194 |
| 7,626,542 | B2 * | 12/2009 | Kober et al. | 342/357.59 |
| 7,656,347 | B2 * | 2/2010 | Hong et al. | 342/194 |
| 7,701,384 | B2 * | 4/2010 | Becker et al. | 342/120 |
| 7,944,392 | B2 * | 5/2011 | Falk | 342/195 |
| 7,969,350 | B2 * | 6/2011 | Winstead et al. | 342/89 |
| 7,995,973 | B2 * | 8/2011 | Dent et al. | 455/87 |
| 8,055,234 | B2 * | 11/2011 | Mattisson et al. | 455/296 |
| 2004/0053579 | A1 | 3/2004 | Ferianz | |
| 2005/0191961 | A1 | 9/2005 | Kunieda et al. | |
| 2005/0212692 | A1 | 9/2005 | Iny et al. | |
| 2006/0273952 | A1 | 12/2006 | Krikorian et al. | |
| 2007/0001896 | A1 | 1/2007 | Hellsten | |
| 2009/0251359 | A1 | 10/2009 | Becker et al. | |

OTHER PUBLICATIONS

State Intellectual Property Office of the People's Republic of China, First Office Action and Search Report for Application No. 201080064178.2, Dec. 10, 2013, 16 pages, China.

Extended European Search Report for Application No. PCT/SE2010/050183, dated Jun. 12, 2013.

Frotzcher, A., et al., *Least Squares Estimation for the Digital Compensation of Tx Leakage in zero-IF Receivers*, Global Telecommunications Conference (2009) pp. 1-6.

State Intellectual Property Office of the People's Republic of China, Second Office Action for Application No. 201080064178.2, Jul. 25, 2014, 9 pages, China.

* cited by examiner

WIDEBAND TRANSMITTER/RECEIVER ARRANGEMENT FOR MULTIFUNCTIONAL RADAR AND COMMUNICATION

This application claims priority from the international application number PCT/SE2010/050183, filed on 17 Feb. 2010.

TECHNICAL FIELD

The present invention relates to a wideband multifunctional transmitter and receiver arrangement, preferably for transmitting and receiving at VHF, UHF or in the microwave bands. Such an arrangement can simultaneously and in the same frequency band serve as radar, surveillance, and communication system.

BACKGROUND ART

In its simplest form, prior art continuous wave CW radar emits a single frequency continuous wave. By measuring the Doppler shift of the return signal, the CW radar can determine the velocity of detected objects. By linear frequency modulation (sawtooth) of the continuous wave in a CW radar, a frequency-modulated continuous wave FMCW radar system is provided. The frequency modulation of the CW has the advantage that also the distance to a detected object can be determined. Such a FMCW radar system is known from U.S. Pat. No. 3,789,398. The FMCW radar is mainly motivated by the fact that it minimizes the peak-to-average power ratio for the radar transmit signal. Its applications are thus as whispering radar, used to defeat detection of the radar signal.

The FMCW radar is however limited to said radar function and lacks any multifunctional capability.

Moreover, the FMCW radar exhibits poor signal cohabitation between its radar function and environmental signals.

There is thus a need for an improved transmitter/receiver arrangement removing the above mentioned disadvantages.

SUMMARY

The object of the present invention is to provide an inventive wideband transmitter/receiver arrangement for transmitting and receiving electromagnetic waves, and a method for transmitting and receiving wideband electromagnetic waves, where the previously mentioned problems are partly avoided. This object is achieved by the features of the characterising portion of claim 1, wherein said transmitter/receiver arrangement comprises a digital arbitrary waveform generator AWG connected to a transmitter, and wherein said waveform generator is configured to generate an arbitrary waveform within a given bandwidth. Said transmitter/receiver arrangement further comprises an antenna arrangement configured to emit a transmitter signal and to receive an incident signal, and a receiver configured to receive a receiver signal. Said transmitter/receiver arrangement further comprises an analogue isolator connected to said antenna arrangement, said transmitter, and said receiver. Said analogue isolator is adapted to route said transmitter signal from said transmitter to said antenna arrangement, and said incident signal from said antenna arrangement to said receiver, and to isolate said transmitter signal from said receiver signal. Said receiver is adapted to cancel any residual transmitter signal in said receiver signal by means of at least one digital model of at least said isolator, said antenna arrangement, and said transmitter.

Said object is further achieved by the characterizing portion of claim 17, wherein said method comprises the steps of generating an arbitrary waveform within a given bandwidth by means of a digital arbitrary waveform generator AWG connected to a transmitter, routing a transmitter signal from said transmitter to an antenna arrangement and an incident signal on said antenna arrangement to a receiver, and isolating said transmitter signal from said receiver signal, by means of an analogue isolator connected to said antenna arrangement, said transmitter, and said receiver, cancelling any residual transmitter signal in said receiver signal by means of at least one digital model of at least said isolator, said antenna arrangement and said transmitter.

Further advantages are achieved by implementing one or several of the features of the dependent claims.

The inventive wideband transmitter/receiver arrangement serves as core for a multifunctional radar, surveillance, and communication system. The system is, due to its excellent leakage cancellation, particularly suitable when compact equipment is required, for example on small or medium sized Unmanned Airborne Vehicle UAV applications. The inventive transmitter/receiver arrangement also leads to reduced weight and volume compared to pulsed radar equipment, and in that transmitter peak power is reduced using CW radar.

The present invention intends to combine the radar function with other uses of electromagnetic signal reception and transmission. A fundamental requirement is that the radar is not pulsed as ordinary radar but operates on a continuous waveform principle, i.e. as the FMCW radar. However, in contrast to the FMCW radar the very idea of the invention is that the waveform must be allowed to be arbitrary and e.g. modulated to serve as a communication signal, whilst still fulfilling its role as radar transmit signal. In this respect known FMCW radar designs are of little use. Indeed the main challenge of continuous wave radar is to achieve isolation between transmit and receive and the methods to do so in the present invention are very different from those of the FMCW radar.

The multifunctional capability of the inventive wideband transmitter/receiver arrangement according to the invention includes providing:
1. Radar functions providing microwave and/or low frequency Synthetic Aperture Radar SAR.
2. Passive surveillance of the signal environment to establish ongoing transmissions.
3. Communication capacity to downlink radar and/or passive surveillance data acquired by the transmitter/receiver arrangement.
4. Communication relay service between different locations/objects, for example between ground units, for extending the range of ground communication links.

Wideband in this concept implies that the system covers bandwidths of at least octave order with a centre frequency anywhere from VHF to well up in the microwave region, i.e. 50 MHz-5 GHz.

Below, aspects of the inventive transmitter/receiver arrangement with respect to radar operation and signal cohabitation will be described. Aspects of the transmitter/receiver arrangement with respect to passive surveillance and communication will also be described but not at the same level of technical detail. Indeed it is obvious to the skilled person in the area of radar technology and RF communication how to adopt the possibility of arbitrary waveforms for the purpose of letting these contain modulated communication and radar data downlink signals. Moreover that the ability of continuous wide band signal reception enables passive signal surveillance. Finally the combination of continuous operation and arbitrary waveform generation enables a variety of communication relay services between different locations in which the radar mimics and repeats the particular modulation the communication channel exploits.

The inventive transmitter/receiver arrangement provides an improved level of signal cohabitation between the radar function and environmental signals. Improvements are possible both in that the radar will not cause a strong interference to communication, and in that the radar will be robust with respect to the interference caused by communication signals.

The issue of cohabitation concerns ways to:
1. Mitigate the interference caused by the radar to these other services, and
2. Mitigate the interference of these services on the radar operation.

Cohabitation issues tend to become important for all radar frequencies as competing uses of the spectrum spreads upwards in frequency to established microwave radar bands. However the issue of cohabitation is particularly crucial for frequencies below about 1 GHz. A large fraction of all communication services are situated in this band. SAR operating below 1 GHz and with bandwidths of the order 100 MHz has the ability of penetrating ground and vegetation, and thus detect objects and structures hidden from ordinary sensors. There is an evident clash in that communication and this type of radar share the same frequencies. One application of the present invention is to moderate this clash.

Consider cohabitation interference mitigation of type 1. This could potentially be reduced if the radar is given an ability to receive and immediately repeat incident signals. This will have a similar effect in a communication channel as multipath effects to which communication modulation schemes must be significantly robust. Modern digital modulation techniques such as OFDM are particularly robust.

Consider cohabitation interference mitigation of type 2. As for robustness of the radar with respect to environmental signal interference, there are several schemes. Narrow band interference can be removed by creating a notch corresponding to the communication band in the range (or "fast time") spectrum. For wide band inference, e.g. digitally modulated television broadcast, this method results in a seriously large degradation of radar data and SAR image quality. Better rejection schemes are to use either cancellation or 2-dimensional notching. The latter method is directly applicable when the radar signal adapts to incident signals as described. This is in fact the essence of the patent application WO 2004/097451, in which the radar mimics an analogue television signal, such that the received television signal will have nearly zero Doppler (or "slow time") bandwidth in the SAR signal processing. It can thus be 2-dimensionally notched, i.e. notched in both the range and the slow time spectrum.

Cancellation, as a method of interference mitigation of type 2, is well suited to digitally modulated signals with built in error correction. Cancellation can be applied as and when the radar ground response signal is so weak that decoding and error correction will fully retrieve the interfering signal. This can then again be encoded, subtracted and thereby mitigated in the overall received signal.

The situation of the radar response signal being weak compared to the interfering signal is what is commonly experienced. It is also the condition for the scheme of transmitter signal adaption to the incoming signal, since this will re-transmit the radar response signal, which must not impair the decoding of the re-transmitted interference signal. A suitable scheme would thus be to adapt transmitter power levels so that the radar response remains a small part of any environmental signal for which one wishes to avoid causing interference.

To achieve above mentioned robustness capabilities, the radar according to the invention should fully capture the interfering signals and retransmit these without interruption. Thus the radar should operate on a continuous transmit waveform principle, and since the radar is required to have an ability to re-transmit any incident signals, it must apart from continuous operation have the added capability of being able to transmit waveforms of arbitrary shape. Such radar, which is the core of the invention, will be called Arbitrary Waveform Continuous Wave AWCW radar. An important candidate for application is as a compact and multifunctional sensor onboard UAVs. The smallness of the UAVs, for which the invention is consider in particular, is in fact an important enabling factor for the realization of the AWCW radar. The radar will operate at short ranges, i.e. with a low transmitter power.

The concept of transmitting an arbitrary wave is not new. Typically arbitrary waveforms are used in the sense pseudo-random noise signal, repeated in a fixed form from pulse to pulse. The present invention however launches the new concept that the waveform can be entirely non-repetitive for any length of time and in fact be able to continuously copy incident signals, which are re-transmitted and used as a part of a total transmit waveform. Moreover this invention launches the concept that this non-repetitive waveform can be continuously transmitted without interrupts for receiving as in ordinary pulsed radar. The arbitrary waveform is suitably generated by an arbitrary waveform generator, which synthesize the waveforms using digital signal processing techniques.

Evidently an AWCW radar device has apart from its applications as radar also the ability to act as a communication link, which is an immediate consequence of its capability to continuously copy incident signals in the transmitted waveform. Moreover, since the transmit waveform is arbitrary it can be modulated to convey sensor data information and thus used to downlink these data. Since the AWCW radar operates with continuous reception it can also fulfil a role of performing signal surveillance within the frequency band for which it is designed. This is done in parallel without any requirement on time sharing or otherwise splitting the capability of the radar device between different applications.

The theory behind the inventive transmitter/receiver arrangement in a radar application is explained below. Assume that a continuous and arbitrary transmitter signal is a(t) and assume that the received signal is r(t). The signal a(t) is assumed to have bandwidth B and is required to have two basic properties: For some pre-selected period of time T, it is required that:
1. the signal a(t) spans B with equal power density for any time interval of length T.
2. the signal a(t) does not repeat itself in the sense that the cross correlation between a(t) and a(t+nT); n=1, 2, . . . is uniformly low for all times t.

Reconstruction of range reflectivity $f(R,t)$, where t is radar slow time can under these conditions be obtained by correlation $$f(R, t) = \int_{t-T/2}^{t+T/2} r\left(t' + \frac{R}{c}\right) a\left(t' - \frac{R}{c}\right) dt' \quad (I)$$

Because of said basic property 1, formula (I) provides bandwidth limited range resolution with a given side lobe level. It is seen that if a(t) would have been periodic with period T there would have been range ambiguities with a period ΔR=cT/2. Hence the absence of such ambiguities is due to said basic property 2. The suppression depth of range ambiguities is limited by the time-bandwidth product BT of a(t). Indeed, for optimal waveforms, the suppression depth will equal BT for all ranges and times. A suitable suppression depth of 40 decibels dB and B=1 GHz would correspond to T=10 μs.

By (I), $f(R,t)$ is low pass filtered to a highest slow time frequency 1/T. The required slow time bandwidth of $f(R,t)$ is set by the SAR Doppler bandwidth. When the transmitter/receiver arrangement is used in an UAV based SAR radar, this is typically of the order 100 Hz and thus significantly smaller than 1/T. In the subsequent SAR processing $f(R,t)$ will be further low pass filtered to a bandwidth corresponding to the reciprocal of the SAR integration time of possibly several seconds. As for interference, the degree of suppression will depend on whether the transmit signal adapts to the interference or not, as discussed above.

If the transmitter signal does not adapt and thus is uncorrelated to an interference signal, then the interference will be suppressed by (I) just as any noise component added to r(t). In effect the suppression ratio is set partly by the averaging occurring in (1) and partly by the further time averaging $f(R,t)$ set by the Doppler bandwidth. Thus for a bandwidth B=1 GHz and Doppler bandwidth 100 Hz, the suppression rate will be 80 dB for interference as well as noise. One difference in this suppression ability between a AWCW radar and e.g. a stepped frequency radar is that the receiver in an AWCW radar receives the full bandwidth at all times, contrary to a stepped frequency radar, which receives only a subband, i.e. step, of the total frequency of the radar bandwidth.

If the transmitter signal does adopt, i.e. mimics the interference within the interference bands, then the interference will be substantially stationary in slow radar time. The method of interference mitigation is in that case to reduce the bandwidth of the interference within the Doppler spectrum, and notch the interference 2-dimensionally—both in the range and Doppler spectrum. The interference is thus effectively removed—not merely suppressed. The impact on SAR image quality is small since the amount of data removed by 2-dimensional filtering is small. As for cancellation, the level of suppression which can be achieved by this methods will add to the cancellation depth obtainable when the transmit signal does not adapt, as described above.

The overriding concern of AWCW radar is to obtain sufficient isolation between the transmitter and receiver signals. The achievable isolation puts a limit on allowable transmitter power level, since the isolation should reduce this level to the receive noise level determined by environmental noise or the receive channel noise. The larger the bandwidth of the radar, the larger the receive channel noise level. On the other hand the possible isolation diminishes with increased bandwidth, due to e.g. the reduced dynamic range of analogue to digital converters ADCs and digital to analogue converters DACs operating at high sampling rates.

Narrow band isolation is achievable by analogue cancellation techniques, as is illustrated in FMCW radars. For wideband isolation however, as required by the inventive transmitter/receiver arrangement, fully developed means for digital cancellation is required. A wideband isolation approach comprising a combined analogue and digital cancellation scheme providing isolation in three logical steps is disclosed:
1. An initial analogue cancellation in an isolator of the transmitter/receiver arrangement, which analogue cancellation is required to be highly linear and time stable and thus accurately characterizable by a digital model.
2. A first analogue and digital cancellation step, which removes any analogue cancellation error with respect to a digital transmitter signal, by making use of that this is accurately known and also that the analogue cancellation system characteristics are accurately known.
3. A second digital cancellation step, which removes the analogue cancellation error for the transmitter noise by making use of that this noise is of relatively low intensity and thus can be accurately AD converted.

No accurate transmitter model is required, since step 3 takes care of such model errors. Note however that the achievable isolation depends on two conflicting requirements, i.e. A) the ability of the analogue system to achieve a high degree of isolation by itself, and B) the characterizability of the analogue system required for obtaining a high isolation in steps 2 and 3. Characterizability here means that an analogue system may possibly be designed to yield a high degree of isolation but only in such a way that leakage residuals are less linear or less stable in time. Hence the degree of isolation achievable in the digital suppression stages will be limited for such a system. A suitable trade off between analogue and digital cancellation must be found.

Another limiting factor is the accuracy of the required DACs. There are thus three main parameters which will limit isolation i.e. the analogue isolation level, the characterizability of the analogue cancellation and the DAC resolution. ADC resolution is a lesser concern since signals to be AD-converters are all low level.

BRIEF DESCRIPTION OF THE DRAWINGS

The present invention will now be described in detail with reference to the figures, wherein.

DETAILED DESCRIPTION

In the following only one embodiment of the invention is shown and described, simply by way of illustration of one mode of carrying out the invention.

Figure 1:
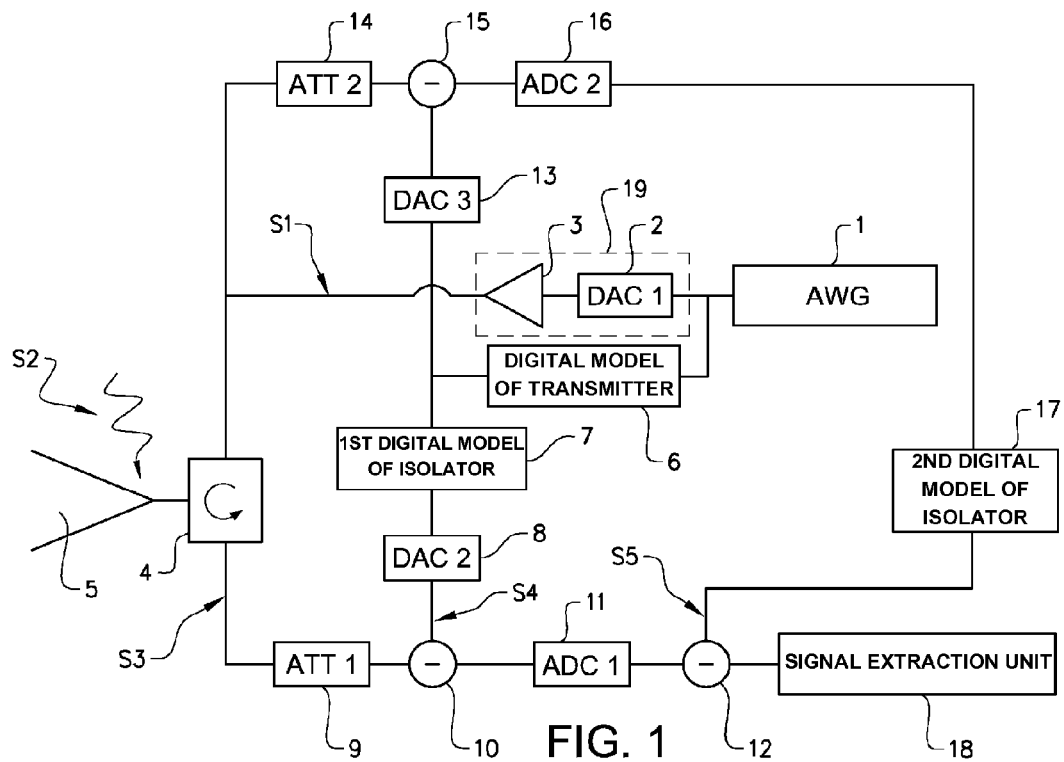
FIG. 1 shows the system building blocks of AWCW radar according to the invention.

FIG. 1 shows the system building blocks of AWCW radar according to the invention. A digital arbitrary waveform generator AWG 1 feeds a transmitter 19 comprising a first digital to analogue converter DAC 2, and a power amplifier 3. The signal generated by the AWG 1 is thus converted to an analogue signal, which is amplified in the power amplifier 3. The transmitter 19 subsequently feeds a transmitter signal S1 into a RF isolator 4, which serves to control the direction of signal flow. The isolator 4 is further connected to an antenna arrangement 5, and to a receiver, such that signals S1 from the transmitter 19 are routed by means of the isolator 4 to the antenna arrangement 5 and isolated from the receiver, and incident signals S2 on the antenna are routed solely to the receiver. The term isolator (4) is here considered to encompass any type of device capable of routing said signals S1, S2 and isolating the transmitter signal S1 from entering the receiver, such as isolator, circulator, and power splitter/combiner networks etc.

A receiver signal S3 from the isolator is fed to a first subtraction unit 10 via a first attenuator 9. The receiver signal S3 has at least three terms, viz. (a) any exterior signal S2 incident on the antenna arrangement 5, (b) antenna reflections and (c) isolator leakage.

A first cancellation signal S4 is generated by feeding the generated waveform signal from the AWG 1 into a digital model 6 of the transmitter 19, then to a first digital model 7 of the isolator 4, the antenna arrangement 5, and a first subtraction unit 10, and then to a second DAC 8. Said first cancellation signal S4 is subsequently fed from the second DAC 8 to the first subtraction unit 10, which is an analogue subtraction unit 10. The signal terms (b) and (c) mentioned above are removed in the first subtraction unit 10, insofar the digital model 6 of the transmitter 19 and said first digital model 7 correctly describes the physical behaviour of the transmitter 19, isolator 4, antenna arrangement 5, and first subtraction unit 10, i.e. how accurate they depict the transfer characteristics of said devices 19, 4, 5, 10. A discrepancy forming at least transmitter noise is most likely to remain in the signal output of the first subtraction unit 10. The intensity of the signal output from the first subtraction unit 10 is significantly reduced compared to the levels of the receiver signal S3 and the first cancellation signal S4 fed to the first subtraction unit 10. The low level signal output from the first cancellation unit 10 is fed to a first analogue to digital converter ADC 11 and subsequently to a second subtraction unit 12, which is a digital subtraction unit 12.

A second cancellation signal S5 is generated by first feeding the output of the digital model 6 of the transmitter 19 to a third DAC 13 whose output signal is fed to a third subtraction unit 15. Another input signal to the third subtraction unit 15 is supplied from the output of the transmitter 19, having passed through a second attenuator 14. The output signal from the third subtraction unit 15 corresponds therefore to the difference between the digital model 6 of the transmitter 19 and the actual transmitter output, i.e. any transmitter noise not subtracted in the first subtraction unit 10 due to an inaccurate digital model 6 of the transmitter 19, amongst others. The signal output of the third subtraction unit 15 will be analogue to digital converted in a second ADC 16 and subsequently fed to a second digital model 17 of the isolator 4, the antenna arrangement 5, and the third subtraction unit 15. This signal will thus match the transmitter noise term fed into the second subtraction unit 12 from the first ADC 11. Hence the output of the second subtraction unit 12 will correspond to any signal S2 incident on the antenna arrangement 5, apart from the above mentioned errors related to the characterizability limitations discussed above and resolution of the first, second and third digital to analogue converters 2, 8, 13, which also limits the possible level of cancellation in the first and third subtraction units 10, 15.

Consequently, the route of the first cancellation signal S4 accurately handles the large amplitude part of the cancellation by omitting analogue to digital conversion. This omission is possible because the large amplitude part of the signal is known. The route of the second cancellation signal S5 handles residuals, which are unknown but have small amplitude and thus allow being analogue to digital converted without critical accuracy being lost.

Signals S1 generated by the transmitter 19 and coupled to the second attenuator 14 and emitted by the antenna arrangement 5, as well as signals S2 received by the antenna arrangement 5 and coupled to the first attenuator 9 are high intensity signals, whereas the signals at the output of the second subtraction unit 12 are just above ADC quantization level, i.e. ADC interior noise level. All other signals in the block diagram of FIG. 1 are signals with reduced levels not to saturate the first and second ADCs 11, 16.

This reasoning can be illustrated using numerical examples:

Assuming a bandwidth of the system of 1 GHz, and 3000 K (degrees Kelvin) internal noise temperature and 30000 K external noise, wherein the elevated external noise is caused by an abundance of interference. The noise level "kTB" is calculated according to:

$$"kTB"=k_B T_s B_n$$

wherein "kTB" is the noise temperature in watts, $k_B$ is the Boltzmann constant ($1.381 \times 10^{-23}$ J/K, joules per Kelvin), $T_s$ is the noise temperature (K), and $B_n$ is the noise bandwidth (Hz). The internal noise level "kTB" is thus −73 dBm and the external noise level −63 dBm. Consider −70 dBm to be the LSB (Least Significant Bit) power for the first ADC 11. If this first ADC 11 has 9 bits, it provides a maximum allowable input power level of about −20 dBm. The 50 dB ADC dynamic range is also assumed to be the accuracy of the radar system digital models.

For state of the art digital to analogue converters DACs noise levels of −70 dBm are assumed achievable at 0 dBm output level. Hence, this means that DAC errors are −70 dB with respect to full scale. The transmitter amplifier 3 will be assumed to output 1 dBW, requiring 30 dB gain. A digital model of a power amplifier is not expected to be highly accurate. Assuming 10 dBm transmitter noise allowing for transmitter digital modelling errors. This corresponds to a transmitter noise factor of 63 dB.

Figure 2:
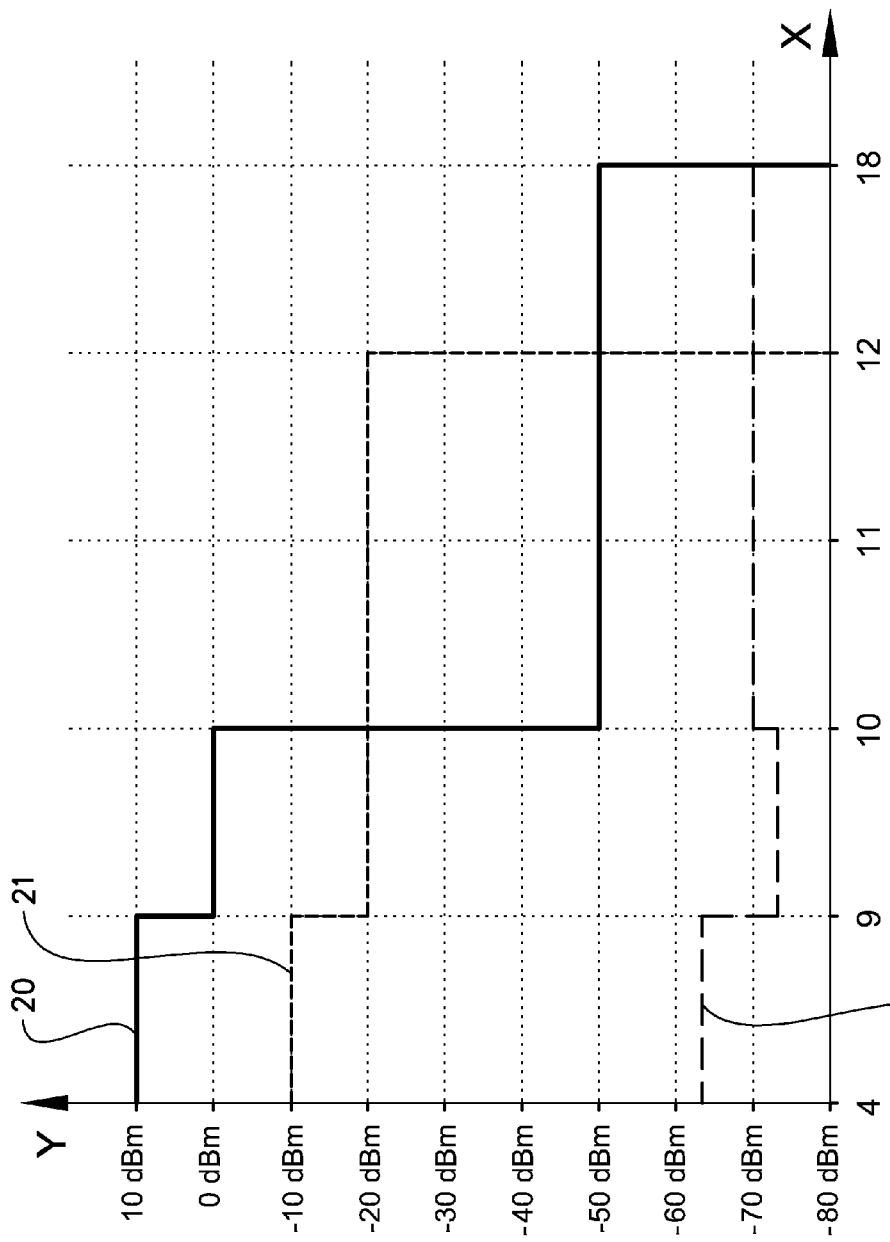
FIG. 2 shows the leakage and noise reduction stages in the receiver according to the invention.

FIG. 2 illustrates the leakage and noise reduction stages in the receiver, wherein the Y-axis represents the signal power in dBm and the X-axis illustrates sequential parts of the receiver, e.g. "9" refers to the first attenuator 9, and "10" refers to the first subtraction unit 10 etc. Assume isolator leakage to be −20 dB. This puts the transmitter signal leakage 20 at the isolator output to 10 dBm, the transmitter noise leakage 21 to −10 dBm, and the external noise level 22 to −63 dBm.

With a 10 dB value for the first attenuator 9, the transmitter signal leakage 20 becomes in parity to the output level of the second DAC 8, whereupon they can cancel in the first subtraction unit 10. The transmitter noise leakage 21 at the output of the first attenuator 9 is −20 dBm, which is full scale for the first ADC 11. A strong interference signal may also yield −10 dBm at the isolator output and correspond to full scale for the first ADC 11.

With a −70 dB accuracy for the DAC resolution and a −50 dB accuracy for the said first digital model 7, the transmitter signal leakage 20 is reduced in the first subtraction unit 10 to −50 dBm. The transmitter noise leakage 21 is not reduced from its full scale value, and the external noise 22 is elevated to −70 dBm due to added noise from the second DAC 8.

The second attenuator 14 must have a value 30 dB to reduce transmitter signal levels to 0 dBm. The transmitter signal S1 from the output of the transmitter 19 and the output of the digital model 6 of the transmitter 19 will thus cancel in the third subtraction unit 15, while transmitter noise remains unmitigated and at its value after the second attenuator 14.

With the 30 dB attenuation in the second attenuator 14 this value is −20 dBm, which also will be full scale for the second ADC 16. In the second subtraction unit 12 the transmitter noise will cancel. Cancellation depth will be given by the quantization noise of the first and second ADCs 11, 16 as well as the accuracy of said second digital model 17. Based on the assumed performance of the first and second ADCs 11, 16, this value is −70 dBm.

In the range reconstruction part the transmitter signal leakage 20 and transmitter noise leakage 21 are further reduced. In fact, the transmitter signal leakage 20 is a replica of the transmit signal delayed by its transmission through the system, as well as distorted by uncontrolled leakage, dispersion and other linear effects, which to a large part are taken care of by the digital corrections imposed. The residual of the transmitter signal leakage 20 imposed on the signal in the range-time reflectivity reconstruction in the signal extraction unit 18 will however remain concentrated to very short delays after transmission and thus mainly affect the signal for very small radar ranges, at which relevant radar data are not expected. Being temporally stable it will also be narrow band in the Doppler spectrum. In all the residual transmitter signal leakage 20 will have a small effect indeed on the reconstructed range reflectivity data $f(R,t)$.

The residual transmitter noise leakage 21 becomes suppressed in proportion to the time bandwidth product of the range reconstruction in the same way as any other noise component added to the received signal.

As described in this example the AWCW radar principle is best suited to moderate and low transmit power and in particular in application such radars operating below 1 GHz, where the external noise levels are elevated compared to the purely thermal environmental noise.

Obvious to the skilled person is that in order to achieve the required cohabitation and communication capabilities, the signal extraction unit 18 must contain means to extract communication subbands and to transfer and insert these signals in the AWG 1, as a part of the transmitted waveform. An ability to demodulate the extracted signals is also required in some of the cohabitation and communication modes. Thus there is a digital part of the system which however is schematically obvious and therefore not shown in FIG. 3. This part connects the signal extraction unit 18 and the AWG 1 and furthermore contains suitable digital encoding and decoding devices, as well as a system controller guiding the signal extraction in the signal extraction unit 18, the waveform generation in the AWG 1, and encoding/decoding processes, as required.

The isolator 4 is a critical part of the AWCW radar design. For one it is difficult to achieve analogue wide band isolation of any significant depth by such a device. Presently isolation value requirements of at least 20 dB are dictated by the assumed −70 dB DAC accuracy.

The other issue regarding isolation is characterizability of the analogue components, implicitly meaning their linearity and time stability. As for linearity, there are both issues concerning intermodulation and (since octave operation is required) harmonic distortion. The accuracy in these aspects must be of the order −70 dB, i.e. the order of the assumed DAC accuracy of 50 dB in the example above. A very high degree of characterizability typically requires passive components and preferably linear materials. Hence both semiconductor and ferrite materials may imply linearity limitations and must be used with particular caution in the present application.

Linear wide band isolator systems can be based on signal cancellation. Such a cancellation system consists of two channels which in independent ways transmit and receive but which cancel each other as regards transmitter leakage through either channel. As for obtaining a large degree of cancellation in a wide band system, the challenge is the many degrees of freedom across which the leakage transfer function in the two channels must be similar. This number of degrees of freedom is basically set by the delay occurring in the system times the signal bandwidth. Hence a circuitry of small extension is normally characterized by short delays and a simple transfer function also in the wide band case. For AWCW radar operating at traditional microwave frequencies, the extension of the system itself is typically many wavelengths. Below 1 GHz, the extension of the system may be less than wavelength order. However in this case the extension of the radar platform becomes decisive, since low frequency antennas are never highly directive and will interact with the platform structure to non-negligible extent. It follows that irrespective of frequency the system will have delays of several periods of the frequencies at which the system operates. An octave bandwidth system will thus correspond to a transfer function of non-trivial shape.

Figure 3:
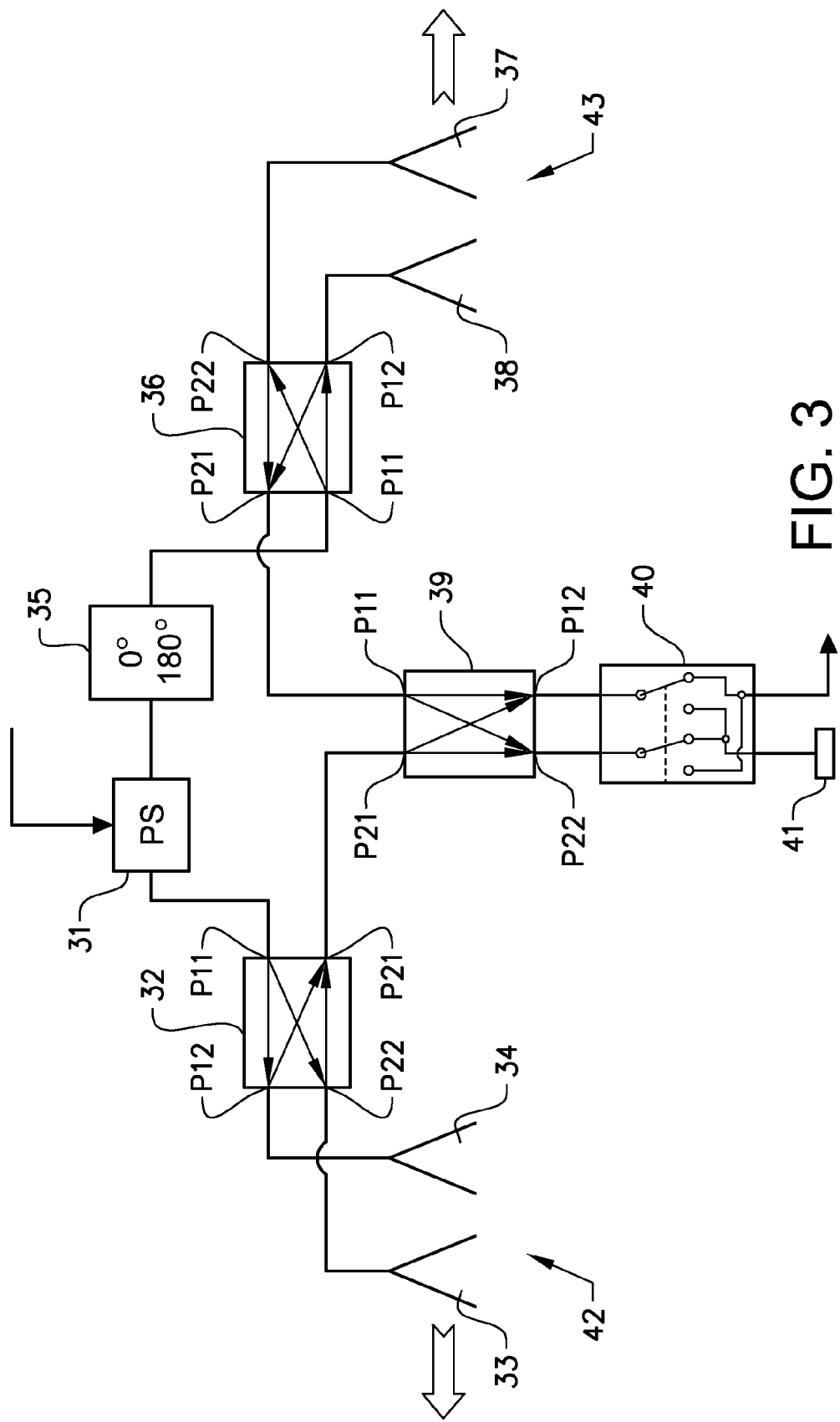
FIG. 3 shows an isolator design according to the invention.

There is one particular way in which such a wide band cancellation scheme for aircraft or UAV operation may be carried out, and which is well suited for frequencies below 1 GHz. The principle relies on the right left symmetry of the airframe and adopts two cancellation channels, which are symmetric in this sense. The device operates simultaneously to both right and left. The transmitter signal leakages through either of the two channels will be the same and the two leakage signals can thus be brought to cancel each other. FIG. 3 illustrates the principle.

In FIG. 3, a preferred realization of a wide band isolator system is described, wherein the cancellation principle is based on first and second circulators 32, 36, preferably 90-degree hybrids, and a power combiner 39, preferably a 180-degree hybrid. The transmitter signal S1 from the transmitter is fed via a power splitter 31 to input ports P11 of the first and second 90-degree hybrids 32, 36. Said first 90-degree hybrid 32 in turn feeds a first antenna element 34 from a coupled port P12, and a second antenna element 33 from a transmitted port P22. Said second 90-degree hybrid 36 in turn feeds a third antenna element 38 from a coupled port P12, and a fourth antenna element 37 from a transmitted port P22.

The first and second antenna element 34, 33 form a right antenna 42, and the third and fourth antenna element 38, 37 form a left antenna 43. The separation between said antenna elements 33, 34, 37, 38 in either antenna 42, 43 is a quarter of a wavelength at the centre frequency. Hence each antenna 42, 43 will propagate the transmitter signal S1 along the separation axis between the antenna elements 33, 34, 37, 38, and in the direction of a phase delay generated by the fact that a signal fed to input port P11 of a 90-degree hybrid 32, 36 will be supplied to transmitted port P22 without phase shift, whereas the same signal will be phase shifted 0→90° on its way from input port P11 to the coupled port P12. Consequently, the direction of the phase delay goes from the coupled port P12 to the transmitted port P22, and the transmitter signal S1 will thus propagate in the direction of the block arrows illustrated in FIG. 3.

Figure 4:
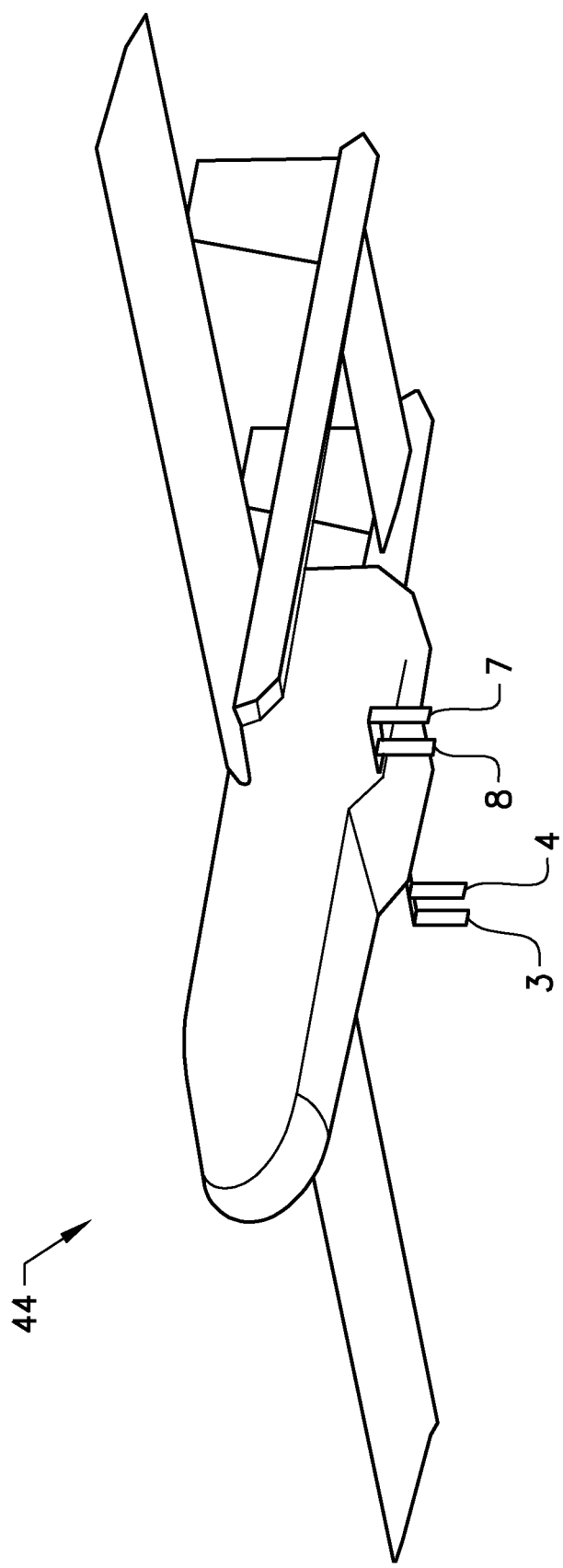
FIG. 4 shows an antenna arrangement of the isolator of FIG. 3 provided on an UAV.

FIG. 4 shows the antenna arrangement 5 on an airborne vehicle 44, such as an UAV. Each antenna 42, 43 is oriented so that the propagation main beam is orthogonal to the airframe centre plane, with the right antenna 42 propagating to the right and the left antenna 43 propagating to the left of the vehicle 44. The right and left antennas 42, 43 are located in a right/left symmetric fashion with respect to the airframe centre plane.

Return signals from the left antenna 43 are collected from the isolator port P21 of the second 90-degree hybrid 36 isolated from transmission and fed to a first input port P11 of the 180-degree hybrid 39. Similarly, return signals from the right antenna 42 are collected from the isolator port P21 of the first 90-degree hybrid 32 and fed to a second input port P21 of a 180-degree hybrid 39. The 180-degree hybrid 39 further comprises a delta port P12 and a sum port P22. Due to the inherent function of the 180-degree hybrid 39, the output signal at sum port P22 is proportional to the sum of the signals at the first and second input ports P11, P21, whereas the output signal at the delta port P12 is proportional to the difference between the signals at the first and second input ports P11, P21. Hence the collected signals from the right and left antennas 42, 43 are provided added and subtracted with an overall phase modification in said delta and sum ports P12 and P22 of the 180-degree hybrid 39. The first switch 35 is either set to transfer the transmitter signal S1 unaffected in which case the second switch 40 is set to feed the difference signal to the to the radar receiver, or the first switch 35 is set to a 180-degree phase shift in which case the second switch 40 is set to feed the sum signal to the radar receiver. In either case, the second switch 40 feeds the remaining signal out from the 180-degree hybrid 39 into a resistive load 41.

If no reflections occur at the coupled and transmitted ports P12, P22 in the 90-degree hybrids 32, 36, an output at the isolator port P21 less than −20 dB with respect to the input signal is achievable, also in broad band applications. However, as a consequence of the 90° phase shifts occurring in both the forward and reflected direction in the first and second 90-degree hybrids 32, 36, reflections due to inferior Voltage Standing Wave Ratio VSWR of the antenna elements 33, 34, 37, 38 in FIG. 3 will combine coherently at the isolator ports P21 of the first and second 90-degree hybrids 32, 36 and thus cause leakage residues. In contrast any coupling between antenna elements 33→34 and 34→33 cancel each other, as do coupling between antenna elements 37→38 and 38→37 at the isolator ports P21 of the first and second 90-degree hybrids 32, 36. The couplings going from the antenna elements in one antenna to the other will not cancel. Just as the antenna reflections these will thus contribute to the signal residues at the isolator ports P21 of the 90-degree hybrids 32, 36.

However given the right left symmetry of antenna arrangement 5 and airframe, the leakage residues at the isolator ports P21 of the 90-degree hybrids 32, 36 are equal in magnitude and equal or opposite in phase, depending on the setting of the first switch 35 as explained. They will thus always cancel in the output of the 180-degree hybrid 39 feeding the radar receiver via the switch 40. This conclusion is valid both for the direct reflections and couplings occurring in or between the antenna elements 33, 34, 37, 38, and also when these effects are extended to include all the electromagnetic interactions with airframe.

In applications below 1 GHz, the antenna elements 33, 34, 37, 38 are typically broad band monopoles or dipoles. They can be vertically or horizontally polarized. In FIG. 3 they are vertically polarized and mounted underneath the UAV fuselage. A mechanism making the antenna elements foldable or retractable might be required for their protection during starting and landing.

The omnidirectional property of radiation, created by this type of isolator 4, is acceptable for the applications 2-4 mentioned. However, in particular in the case of SAR (application 1) one requires one-sidedness for non-ambiguous SAR image formation. Such one-sidedness can be achieved over time. The first and second switch 35, 40 provide this function. While reversing the polarity of the transmitter signal S1 going to one side of the antenna arrangement 5, the polarity of the return signal is reversed for the same side. By the correlation of equation (I) in which the same un-shifted transmitter signal replica is used for both sides either the sum or difference $f_{Right}(R,t) \pm f_{Left}(R,t)$ of the right and left radar reflectivity functions $f_{Left}(R,t)$, $f_{Right}(R,t)$ is obtained. Switching at a period sufficiently larger than the Doppler bandwidth (of the order 100 Hz) the resulting reflectivities can be linearly combined to extract $f_{Left}(R,t)$, $f_{Right}(R,t)$ individually.

For SAR operation switching must occur sufficiently fast with respect to slow time bandwidth of the ground reflectivity. A typical switching frequency might be 1 kHz. Switching could for instance be made synchronous with the orthogonal frequency-division multiplexing OFDM symbol rate in cohabitation schemes with television OFDM modulation.

The first subtraction unit 10 is suitably based on a 180-degree hybrid. In contrast to the isolator 4, the first subtraction unit 10 is required to achieve a very high degree of cancellation. The required levels of cancellation are obtained by a pre-distortion of the transmitter signal S1, carried out in the digital model 6 of the transmitter 19 and said first digital model 7. Apart from the transfer characteristics of the transmitter 19, the isolator 4, and antenna arrangement 5, the pre-distortion must account for the non-perfectness of the 180-degree hybrid forming the first subtraction unit 10. The third subtraction unit 15 is suitably designed in the same manner of a 180-degree hybrid, and is subjected to similar requirements as the first subtraction unit 10.

The cancellation step in the second subtraction unit 12 is performed entirely digital. Said second digital model 17 follows exactly the same principles as the digital model 6 of the transmitter 19, and said first digital model 7, but is acting on transmitter noise. All digital models 6, 7, 17 included in the receiver/transmitter arrangement are preferably implemented as digital finite impulse response FIR filter. The characteristics of such filters and the techniques for modelling them are generally known. Those skilled in the art who have the benefit of this description will be able to develop the necessary software to achieve the digital filter required to meet the needs of their particular situation.

Knowing the transfer characteristics of the system, the pre-distortion is determined by the equation $$y(t) = k_{11} a \sin(\omega t + \alpha + \gamma_{11}) + k_{12} b \sin(\omega t + \beta + \gamma_{12}) \quad (II)$$

Here y(t) is the output signal of the first subtraction unit 10 for any particular frequency ω. The 180-degree hybrid forming the first subtraction unit 10 is characterised by the real, non-negative but frequency dependent transmission and coupling constants $k_{11}$ and $k_{12}$, and the frequency dependent phase shifts $\gamma_{11}$ and $\gamma_{12}$. For a 180-degree hybrid $k_{11} \approx k_{12} \approx 1$ whereas $\gamma_{11} \approx \pi/2$ and $\gamma_{12} \approx -\pi/2$. Moreover a is the real, non-negative but frequency dependent lumped transmission constant for the isolator 4 and amplifier 3, and α the corresponding frequency dependent phase shift. In order to achieve perfect cancellation the required distortion of the transmitter signal S1 in said first digital model 7, the following transfer characteristics must be imposed $$b = \frac{k_{11} a}{k_{12}} \quad \text{(III)}$$

$$\beta = \pi - \alpha - \gamma_{11} - \gamma_{12}$$

The resulting cancellation will be perfect up to the accuracy of the assumption (II) as well as the accuracy of the second DAC 8.

To achieve sufficient accuracy of the cancellation filters they should be calibrated by launching test signals from the AWG 1 through the system. In principle, the test signals can be series of impulses, each consisting of a single non-zero sample transmitted by the AWG 1. The impulse will spread in time by the expected delays in the analogue parts of the system. The separation of each impulse in the test signal should be sufficient not to cause ambiguities due to this spreading. The length of the calibration series should be chosen so that when responses are coherently added the obtained signals levels are well above the system internal noise.

The calibration measurement will directly determine the FIR filter coefficients of the digital models 6, 7, 17 representing the analogue system undergoing calibration. By this method said first and second digital models 7, 17, as well as the digital model 6 of the transmitter 19 can all be determined.

Figure 5A:
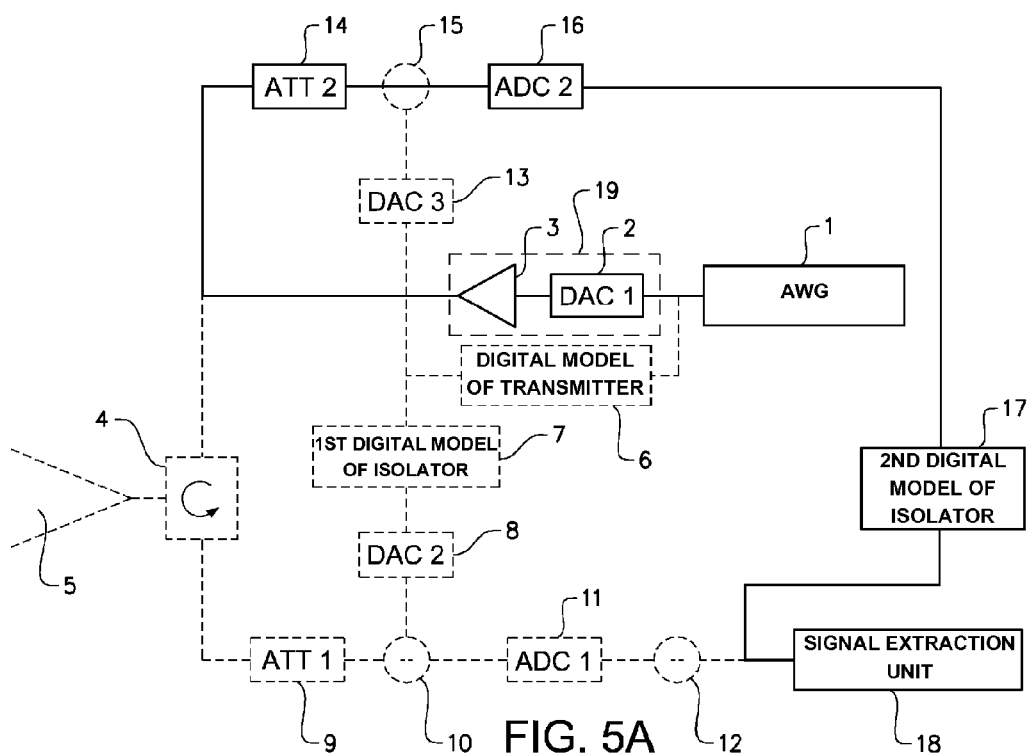
FIG. 5A shows a calibration arrangement for determining a digital model of a transmitter according to the invention.

For a complete calibration four calibration configurations are advocated, these four calibration arrangements being illustrated in FIGS. 5A-5D. In FIG. 5A, a test signal is generated by the AWG 1 and transmitted to the signal extraction unit 18, which can derive the digital model 6 of the transmitter 19 directly. During this calibration step, no transformation of the signal is performed in the second digital model 17. The accuracy is limited by the resolution of the second ADC 16, and will be relatively coarse. However the transmitter 19 needs not to be determined very accurately due to the second subtraction unit 12, which cancels transmitter noise.

Figure 5B:
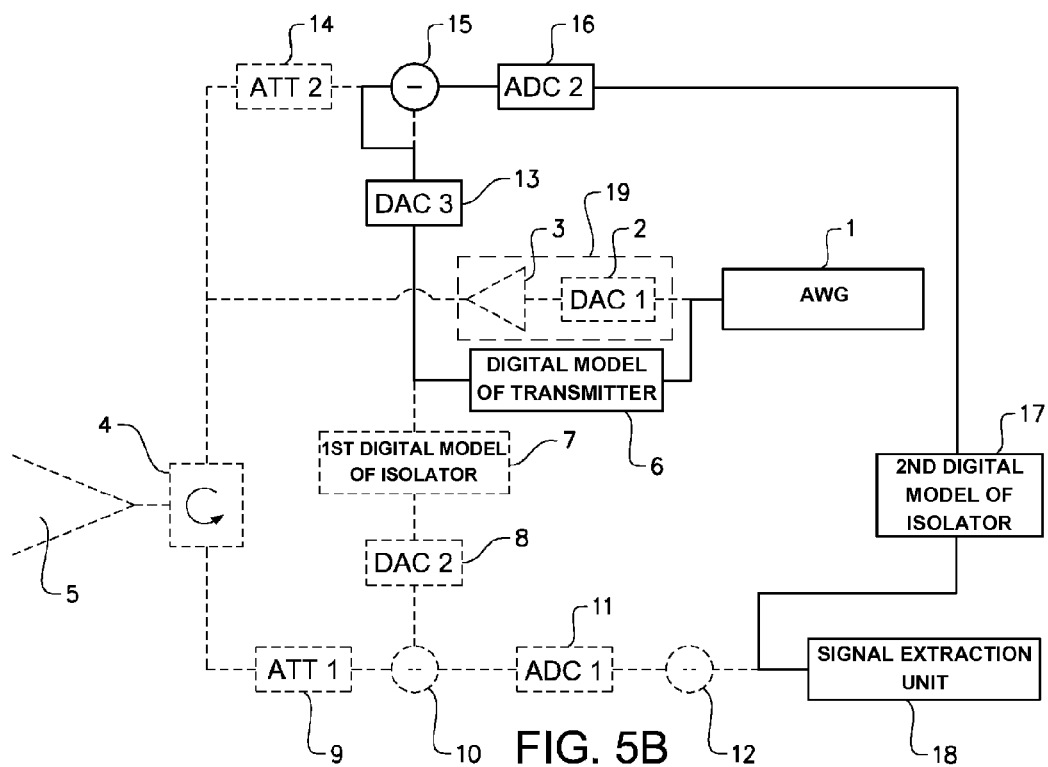
FIG. 5B shows a calibration arrangement for determining the characteristics of a subtraction unit according to the invention.

In FIG. 5B the characteristics of the 180-degree hybrid forming the third subtraction unit 15, and the pre-distortion coefficients required for its role as subtraction unit, are determined. The test signal generated by the AWG 1 and applied to the digital model 6 of the transmitter 19 is fed to both input ports, one by one, of the third subtraction unit 15, and subsequently to the signal extraction unit 18, where the characteristics of the 180-degree hybrid forming the third subtraction unit 15 is derived. During this calibration step, no transformation of the signal is performed in the second digital model 17.

Figure 5C:
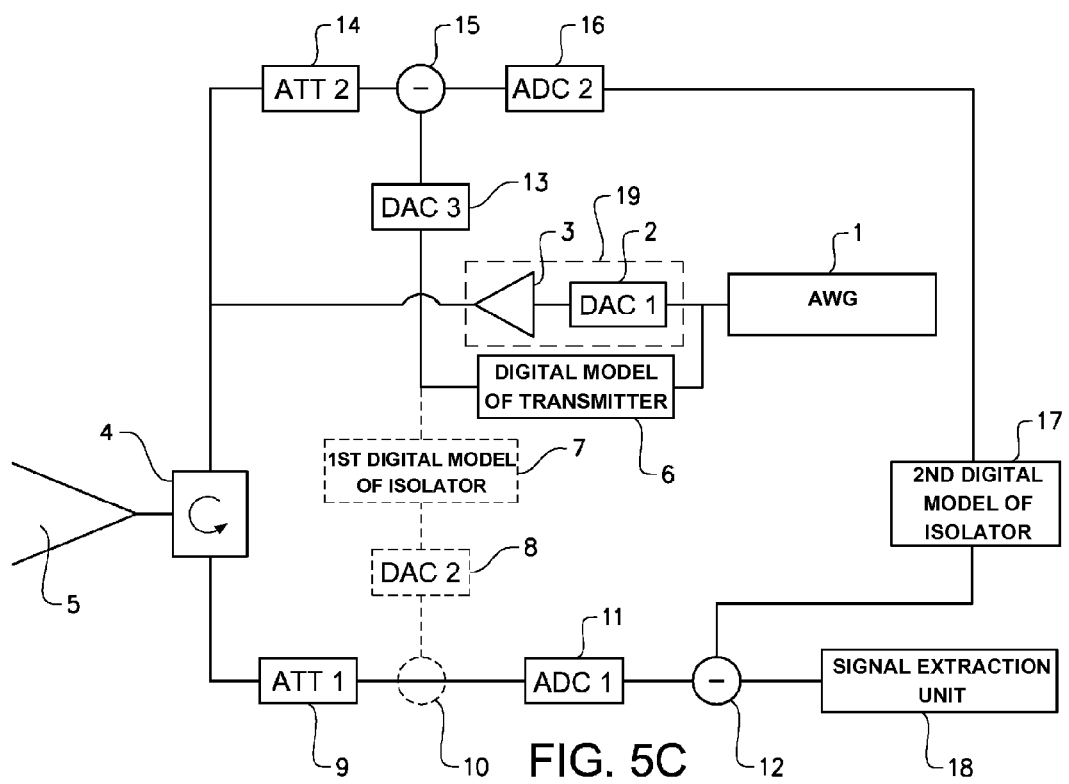
FIG. 5C shows a calibration arrangement for determining a digital model of an isolator and antenna arrangement according to the invention.

In FIG. 5C, the characteristics of the isolator 4 and antenna arrangement 5 is determined. Since both the digital model 6 of the transmitter 19 and the second digital model 17 of the 180-degree hybrid forming the third subtraction unit 15 are known, a transmitter noise cancellation loop can be set up. Isolator 4 characteristics have to be determined to the accuracy level of the actual radar returns, which thus has to be separated from the isolator responses. This is done by the signal extraction unit 18 where the system response all will be at essentially zero range, as already described in connection with FIG. 2. Since signals out of the isolator 4 are weak, calibration requires the power amplifier 3. This is possible with the transmitter noise cancelation loop active.

Figure 5D:
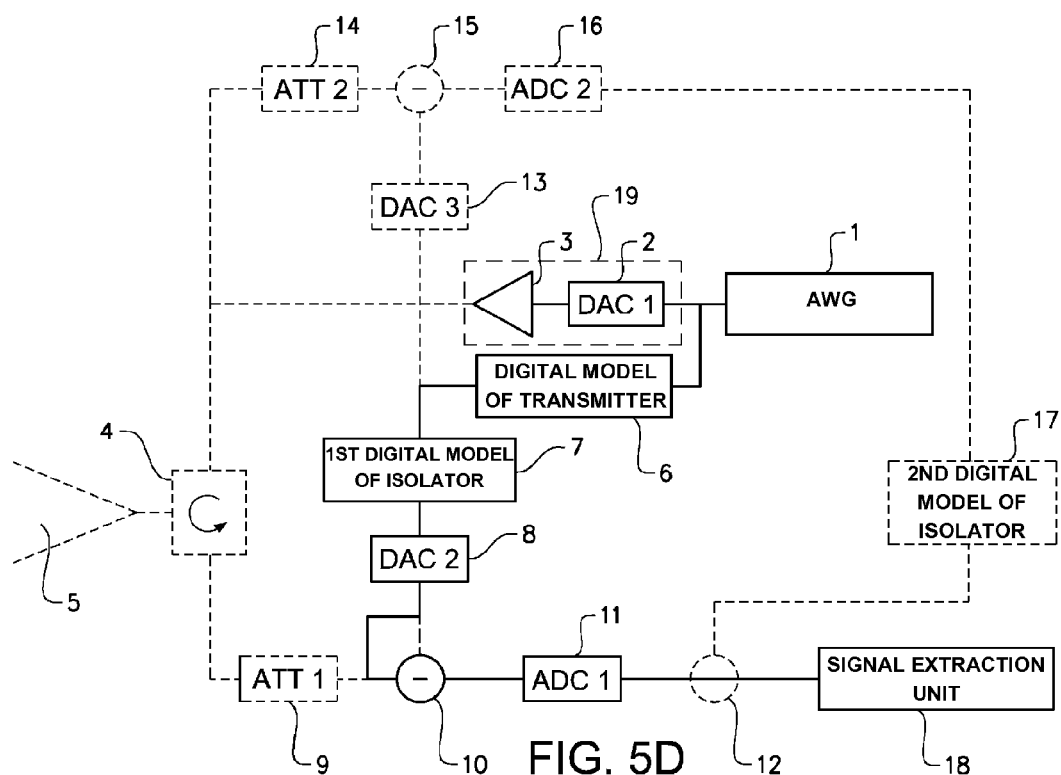
FIG. 5D shows a calibration arrangement for determining the characteristics of a subtraction unit according to the invention.

Finally in FIG. 5D the 180-degree hybrid of the first subtraction unit 10 is characterized in a way similar to the 180-degree hybrid of the third subtraction unit 15, wherein the first digital model 7 of the isolator 4 and antenna arrangement 5 previously determined is used.

The different calibration configuration can all be realized by suitable switches inserted to redirect signals as required.

Moreover, calibrations are suitable conducted with the AWCW radar system in situ in the radar platform, and with the radar platform located in an environment corresponding to its predetermined field of use, for example airborne in case of a SAR application. Thus effects of antenna interaction with the platform structure will be fully accounted for.

As will be realised, the invention is capable of modification in various obvious respects, all without departing from the scope of the appended claims. For example, the wideband cancellation scheme might also be realized without said third digital cancellation step where appropriate, if reduced isolation can be tolerated, whereby the digital model 6 of the transmitter 19 and said first digital model 7 can be integrated into a single digital model. Accordingly, the drawings and the description thereto are to be regarded as illustrative in nature, and not restrictive.

The invention claimed is:

1. A wideband transmitter/receiver arrangement for transmitting and receiving electromagnetic waves comprising:
   a digital arbitrary waveform generator AWG connected to a transmitter, wherein said waveform generator is configured to generate an arbitrary waveform within a given bandwidth,
   an antenna arrangement configured to emit a transmitter signal, and to receive an incident signal,
   a receiver configured to receive a receiver signal, and
   an analogue isolator connected to said antenna arrangement, said transmitter, and said receiver,
   wherein:
      said analogue isolator is adapted to route said transmitter signal from said transmitter to said antenna arrangement, and said incident signal from said antenna arrangement to said receiver, and to isolate said transmitter signal from said receiver signal, and
      said receiver is adapted to cancel an isolator transmission leakage signal in said receiver signal by means of at least one digital model of at least said isolator, said antenna arrangement, and said transmitter.

2. The wideband transmitter/receiver arrangement according to claim 1, comprising a first subtraction unit, which is configured to subtract a first cancellation signal from said receiver signal received from said isolator, said first cancellation signal received from said at least one digital model is configured to correspond to a predicted effect on the isolator transmission leakage signal of said waveform interacting with at least said transmitter, said isolator and said antenna arrangement.

3. The wideband transmitter/receiver arrangement according to claim 2, comprising a second subtraction unit, which is configured to subtract a second cancellation signal from a signal received from an output of said first subtraction unit, said second cancellation signal received from said at least one digital model is configured to correspond to at least a predicted effect on the isolator transmission leakage signal of a transmitter noise generated in said transmitter interacting with at least said isolator and said antenna arrangement.

4. The wideband transmitter/receiver arrangement according to claim 3, said at least one digital model comprises a second digital model of at least said isolator and said antenna arrangement, wherein said second cancellation signal corresponds to a digitized representation of said transmitter noise applied to said second digital model.

5. The wideband transmitter/receiver arrangement according to claim 4, wherein said digitized representation of said transmitter noise is arranged to be generated by a third subtraction unit, which is coupled to said transmitter, and to said digital model of said transmitter.

6. The wideband transmitter/receiver arrangement according to claim 5, wherein said first and third subtraction units are analogue subtraction units, in that said first digital model is a digital model of at least said isolator, said antenna arrangement and said first analogue subtraction unit, and in that said second digital model is a digital model of at least said isolator, said antenna arrangement, and said third analogue subtraction unit.

7. The wideband transmitter/receiver arrangement according to claim 4, wherein,
said first subtraction unit (10) is an analogue subtraction unit connected to an output of said isolator via a first attenuator, and to said first digital model via a second DAC,
said second subtraction unit is a digital subtraction unit connected to an output of said first subtraction unit via a first analogue to digital converter ADC, and to said second digital model (17), and in that
said second digital model is connected to said second subtraction unit via a second ADC, wherein said second subtraction unit is coupled to said power amplifier via a second attenuator, and to said digital model of said transmitter via a third DAC.

8. The wideband transmitter/receiver arrangement according to claim 2 said at least one digital model comprising a first digital model of at least said isolator and said antenna arrangement, and a digital model of said transmitter, wherein said first cancellation signal corresponds to an output signal of said AWG applied to said digital model of said transmitter and to said first digital model.

9. The wideband transmitter/receiver arrangement according to claim 1, said transmitter comprises a first digital to analogue converter DAC coupled to a power amplifier, wherein said first DAC is connected to said AWG, and said power amplifier is connected to said isolator.

10. The wideband transmitter/receiver arrangement according claim 1, said isolator comprising a power splitter, a first circulator connected to a right antenna said antenna arrangement, a second circulator connected to a left antenna of said antenna arrangement, and a power combiner, wherein said power splitter is configured to receive a transmitter signal from said transmitter, and to feed said first and second circulators, which are configured to route any incident signals on said right and left antennas to said power combiner, wherein said power splitter and power combiner are configured to supply at an output of said power combiner a difference signal corresponding to a difference between said right and left antenna incident signals, when said right and left antennas are fed in phase, or a sum signal corresponding to a sum of said right and left antenna incident signals when said right and left antennas are fed in opposite phase.

11. The wideband transmitter/receiver arrangement according to claim 10, said isolator further comprises comprising:
a first switch configured to switch the polarity of a signal received from said power splitter and fed to one of said right and left antennas, such that said right and left antennas can be fed in phase, and in opposite phase, and
a second switch connecting said power combiner with said output of said isolator, and configured to switch simultaneous with said first switch, such that to route said difference signal to said output of said isolator when said right and left antennas are fed in phase, and to route said sum signal to said output of said isolator when said right and left antennas are fed in opposite phase.

12. The wideband transmitter/receiver arrangement according to claim 11, wherein,
said first circulator is formed of a first 90-degree hybrid connected by an input port to said power splitter, in that said second circulator is formed of a second 90-degree hybrid connected by an input port to said power splitter, wherein one of said first and second 90-degree hybrids is connected to said power splitter via said first switch,
said right antenna comprises a first and a second antenna element, which are connected to a coupled and transmitted port of said first 90-degree hybrid respectively,
said left antenna comprises a third and a fourth antenna element, which are connected to a coupled and transmitted port of said second 90-degree hybrid respectively,
said power combiner is formed of a 180-degree hybrid, and wherein a first input port of said 180-degree hybrid is connected to an isolator port of said second 90-degree hybrid, a second input port of said 180-degree hybrid is connected to an isolator port of said first 90-degree hybrid, and delta and sum ports of said 180-degree hybrid are connected to said second switch, and
said second switch connects said delta and sum ports with said resistive load, and said output of said isolator.

13. A method for transmitting and receiving wideband electromagnetic waves, said method comprising the steps:
generating an arbitrary waveform within a given bandwidth by means of a digital arbitrary waveform generator AWG connected to a transmitter,
routing a transmitter signal from said transmitter to an antenna arrangement and an incident signal on said antenna arrangement to a receiver, and isolating said transmitter signal from said receiver signal, by means of an analogue isolator connected to said antenna arrangement, said transmitter, and said receiver, and
cancelling an isolator transmission leakage signal in said receiver signal by means of at least one digital model of at least said isolator, said antenna arrangement and said transmitter.

14. A combined radar, surveillance and communication system comprising an AWCW radar system that comprises:
a wideband transmitter/receiver arrangement for transmitting and receiving electromagnetic waves, said wideband transmitter/receiver arrangement comprising:
a digital arbitrary waveform generator AWG connected to a transmitter, wherein said waveform generator is configured to generate an arbitrary waveform within a given bandwidth,
an antenna arrangement configured to emit a transmitter signal, and to receive an incident signal,
a receiver configured to receive a receiver signal,
an analogue isolator connected to said antenna arrangement, said transmitter, and said receiver, wherein said analogue isolator is adapted to route said transmitter signal from said transmitter to said antenna arrangement, and said incident signal from said antenna arrangement to said receiver, and to isolate said transmitter signal from said receiver signal,
wherein said receiver is adapted to cancel an isolator transmission leakage signal in said receiver signal by means of at least one digital model of at least said isolator, said antenna arrangement, and said transmitter,
and said transmitter/receiver arrangement further comprises a second subtraction unit, which is configured to subtract a second cancellation signal from a signal received from an output of said first subtraction unit, said second cancellation signal received from said at least one digital model is configured to correspond to at least a predicted effect on the isolator transmission leakage signal of a transmitter noise generated in said transmitter interacting with at least said isolator and said antenna arrangement, and a wideband RF communication unit for simultaneously receiving any incident RF communication signals and re-transmitting said signals.

15. The radar, surveillance and communication system of claim 14, said wideband RF communication unit comprising:

said wideband transmitter/receiver arrangement for transmitting and receiving electromagnetic waves, wherein said output of said second subtraction unit, which is configured to correspond to incident communication signals on said antenna arrangement, feeds said digital arbitrary waveform generator for substantially immediate re-transmittance of said incident communication signals.

16. An airborne vehicle comprising:

an airframe, which is mirror symmetric with respect to a central plane of said vehicle so as to divide said vehicle in a right and left part as seen from the rear of said vehicle; and a wideband transmitter/receiver arrangement for transmitting and receiving electromagnetic waves, said arrangement comprising:

(i) a digital arbitrary waveform generator AWG connected to a transmitter, wherein said waveform generator is configured to generate an arbitrary waveform within a given bandwidth, (ii) an antenna arrangement configured to emit a transmitter signal, and to receive an incident signal, (iii) a receiver configured to receive a receiver signal, and (iv) an analogue isolator connected to said antenna arrangement, said transmitter, and said receiver, wherein:

said receiver is adapted to cancel an isolator transmission leakage signal in said receiver signal by means of at least one digital model of at least said isolator, said antenna arrangement, and said transmitter, said analogue isolator is adapted to route said transmitter signal from said transmitter to said antenna arrangement, and said incident signal from said antenna arrangement to said receiver, and to isolate said transmitter signal from said receiver signal, said isolator comprises a power splitter, a first circulator connected to a right antenna said antenna arrangement, a second circulator connected to a left antenna of said antenna arrangement, and a power combiner, said power splitter is configured to receive a transmitter signal from said transmitter, and to feed said first and second circulators, which are configured to route any incident signals on said right and left antennas to said power combiner, said power splitter and power combiner are configured to supply at an output of said power combiner a difference signal corresponding to a difference between said right and left antenna incident signals, when said right and left antennas are fed in phase, or a sum signal corresponding to a sum of said right and left antenna incident signals when said right and left antennas are fed in opposite phase, said right antenna is arranged on said right part of said vehicle, said left antenna is arranged on said left part of said vehicle, and said right and left antennas are arranged symmetrically with respect to said central plane.

17. An arbitrary waveform continuous wave AWCW radar system, especially suitable for providing high resolution microwave SAR, and low frequency SAR, said radar system comprising:

a wideband transmitter/receiver arrangement for transmitting and receiving electromagnetic waves, said arrangement comprising:

(i) a digital arbitrary waveform generator AWG connected to a transmitter, wherein said waveform generator is configured to generate an arbitrary waveform within a given bandwidth, (ii) an antenna arrangement configured to emit a transmitter signal, and to receive an incident signal, (iii) a receiver configured to receive a receiver signal, (iv) an analogue isolator connected to said antenna arrangement, said transmitter, and said receiver, (v) a first subtraction unit, which is configured to subtract a first cancellation signal from said receiver signal received from said isolator, said first cancellation signal received from said at least one digital model is configured to correspond to a predicted effect on the isolator transmission leakage signal of said waveform interacting with at least said transmitter, said isolator and said antenna arrangement, and (vi) a second subtraction unit, which is configured to subtract a second cancellation signal from a signal received from an output of said first subtraction unit, said second cancellation signal received from said at least one digital model is configured to correspond to at least a predicted effect on the isolator transmission leakage signal of a transmitter noise generated in said transmitter interacting with at least said isolator and said antenna arrangement, wherein:

said analogue isolator is adapted to route said transmitter signal from said transmitter to said antenna arrangement, and said incident signal from said antenna arrangement to said receiver, and to isolate said transmitter signal from said receiver signal, said receiver is adapted to cancel an isolator transmission leakage signal in said receiver signal by means of at least one digital model of at least said isolator, said antenna arrangement, and said transmitter, and an output of said second subtraction unit is connected to a signal extraction unit for reconstruction of range reflectivity.

18. A wideband RF communication unit for simultaneously receiving any incident RF communication signals and re-transmitting said signals, said communication unit comprising:

a wideband transmitter/receiver arrangement for transmitting and receiving electromagnetic waves, said arrangement comprising:

(i) a digital arbitrary waveform generator AWG connected to a transmitter, wherein said waveform generator is configured to generate an arbitrary waveform within a given bandwidth, (ii) an antenna arrangement configured to emit a transmitter signal, and to receive an incident signal, (iii) a receiver configured to receive a receiver signal, (iv) an analogue isolator connected to said antenna arrangement, said transmitter, and said receiver, (v) a first subtraction unit, which is configured to subtract a first cancellation signal from said receiver signal received from said isolator, said first cancellation signal received from said at least one digital model is configured to correspond to a predicted effect on the isolator transmission leakage signal of said waveform interacting with at least said transmitter, said isolator and said antenna arrangement, and (vi) a second subtraction unit, which is configured to subtract a second cancellation signal from a signal received from an output of said first subtraction unit, said second cancellation signal received from said at least one digital model is configured to correspond to at least a predicted effect on the isolator transmission leakage signal of a transmitter noise generated in said transmitter interacting with at least said isolator and said antenna arrangement, wherein:

said analogue isolator is adapted to route said transmitter signal from said transmitter to said antenna arrangement, and said incident signal from said antenna arrangement to said receiver, and to isolate said transmitter signal from said receiver signal, said receiver is adapted to cancel an isolator transmission leakage signal in said receiver signal by means of at least one digital model of at least said isolator, said antenna arrangement, and said transmitter, and an output of said second subtraction unit, which is configured to correspond to incident communication signals on said antenna arrangement, feeds said digital arbitrary waveform generator for substantially immediate re-transmittance of said incident communication signals.

* * * * *